US012546729B2

(12) United States Patent
Herriot

(10) Patent No.: US 12,546,729 B2
(45) Date of Patent: Feb. 10, 2026

(54) TRANSPORTABLE CONTAINER INCLUDING A BODY SCANNER

(71) Applicant: AIRPORT CAPACITY SOLUTIONS LIMITED, Northampton (GB)

(72) Inventor: Alistair Herriot, Northampton (GB)

(73) Assignee: AIRPORT CAPACITY SOLUTIONS LIMITED, Northampton (GB)

( * ) Notice: Subject to any disclaimer, the term of this patent is extended or adjusted under 35 U.S.C. 154(b) by 22 days.

(21) Appl. No.: 17/469,860

(22) Filed: Sep. 8, 2021

(65) Prior Publication Data

US 2022/0412899 A1 Dec. 29, 2022

Related U.S. Application Data

(60) Provisional application No. 63/216,001, filed on Jun. 29, 2021.

(51) Int. Cl.
*G01N 23/00* (2006.01)
*G01N 23/04* (2018.01)
*G01V 5/22* (2024.01)

(52) U.S. Cl.
CPC ............... *G01N 23/04* (2013.01); *G01V 5/22* (2024.01)

(58) Field of Classification Search
None
See application file for complete search history.

(56) References Cited

U.S. PATENT DOCUMENTS

2008/0266165 A1* 10/2008 Daly .................... G01S 7/02
340/5.82

* cited by examiner

*Primary Examiner* — Dani Fox
(74) *Attorney, Agent, or Firm* — Rahman LLC

(57) ABSTRACT

A transportable container includes an entrance, an exit, and a body scanner disposed between the entrance and the exit. The transportable container may also include a baggage screening machine.

21 Claims, 6 Drawing Sheets

TRANSPORTABLE CONTAINER INCLUDING A BODY SCANNER

TECHNICAL FIELD

The present technology is generally related to security systems for screening individuals and their baggage at various different types of events.

BACKGROUND

Airport systems for screening individuals and baggage are familiar from airports. Prior airport systems included metal detectors for detecting metallic objects on the body of a person. Recently, body scanners that are based on electromagnetic radiation have conic to the fore. Baggage scanners have gone through a similar evolution from simple metal detectors to scanners that are able to display a visual representation of the contents of baggage based on electromagnetic radiation detection. Such airport systems are sophisticated and are fixed installations that are expensive to build. There are events, which are not necessarily airport based, that may benefit from baggage and person scanning, but the costs of making a fixed installation of the necessary equipment may be prohibitive. It is desirable to be able to detect weapons of all kinds (bombs, guns, knives, etc.) and other nefarious materials (e.g. illicit drugs) at all manner of events such as concerts, conferences, shows, etc.

Accordingly, it is desirable to provide a body and/or baggage screening system that can be quickly adapted to different events and which is not prohibitively expensive. Furthermore, other desirable features and characteristics will become apparent from the subsequent detailed description and the appended claims, taken in conjunction with the accompanying drawings and the foregoing technical field and background.

BRIEF SUMMARY

In one aspect, a transportable container is provided. The transportable container includes an entrance, an exit and a body scanner disposed between the entrance and the exit.

In embodiments, the body scanner includes a metal detector.

In embodiments, the body scanner includes an imaging device. In embodiments, the imaging device includes an X-ray or millimeter wave imaging device.

In embodiments, the transportable container includes a baggage screening machine.

In embodiments, the baggage screening machine includes a computerized X-ray machine.

In embodiments, the baggage screening machine includes a conveyor to transport baggage between an in-teed end and an out-feed end.

In embodiments, the in-feed end is disposed on an entrance side of the body scanner and the out-feed end is disposed on an exit side of the body scanner.

In embodiments, the transportable container includes corner lifting fittings such that the transportable container can be lifted by crane.

In embodiments, the transportable container is box shaped.

In embodiments, the transportable container is a rectangular prism.

In embodiments, the transportable container includes a steel or other metal rectangular prism framework and relatively light weight wall panels.

In embodiments, the transportable container includes an environmental control unit for controlling a temperature within the transportable container.

In embodiments, the transportable container includes a partitioned operator room.

In embodiments, the operator room includes a display interface for displaying a representation of an output from the body scanner.

In embodiments, the transportable container comprises at least one camera mounted to the transportable container.

In embodiments, the transportable container comprises an access ramp and an egress ramp.

In embodiments, the transportable container has relatively long side walls and relatively short end walls, wherein the entrance and exit are included in the relatively long side walls.

In embodiments, the transportable container comprises a linking door in one of the relatively short end walls to connect to an external search room.

In embodiments, the entrance and exit include operable and closeable doors and an air curtain device to make an air curtain when the doors are open.

The details of one or more aspects of the disclosure are set forth in the accompanying drawings and the description below. Other features, objects, and advantages of the techniques described in this disclosure will be apparent from the description and drawings, and from the claims.

DETAILED DESCRIPTION

The following detailed description is merely illustrative in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, brief summary or the following detailed description.

Figure 1:
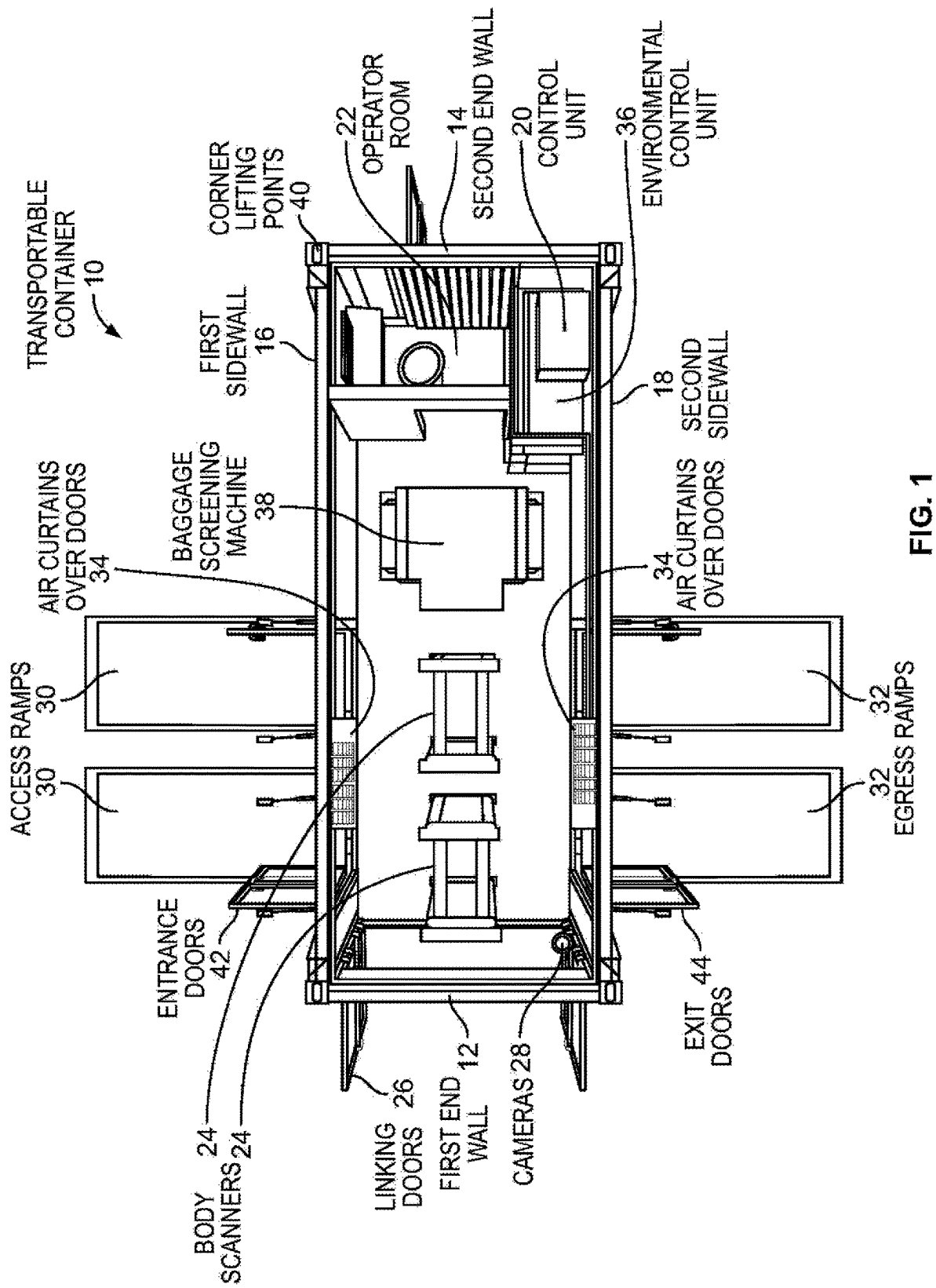
FIG. 1 is a plan view of a transportable container, in accordance with various embodiments.
Figure 2:
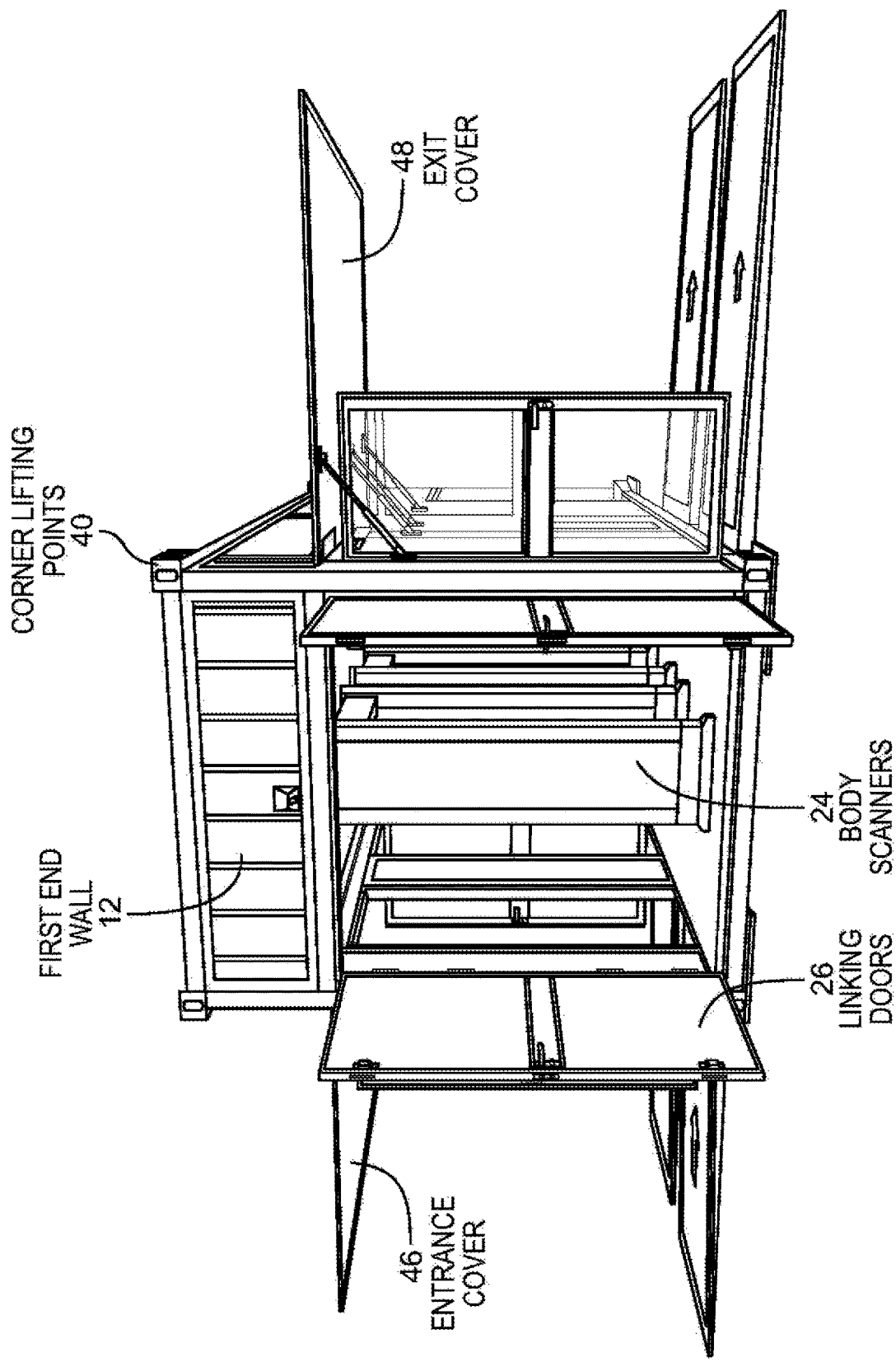
FIG. 2 is an end view of the transportable container of FIG. 1, in accordance with various embodiments.
Figure 3:
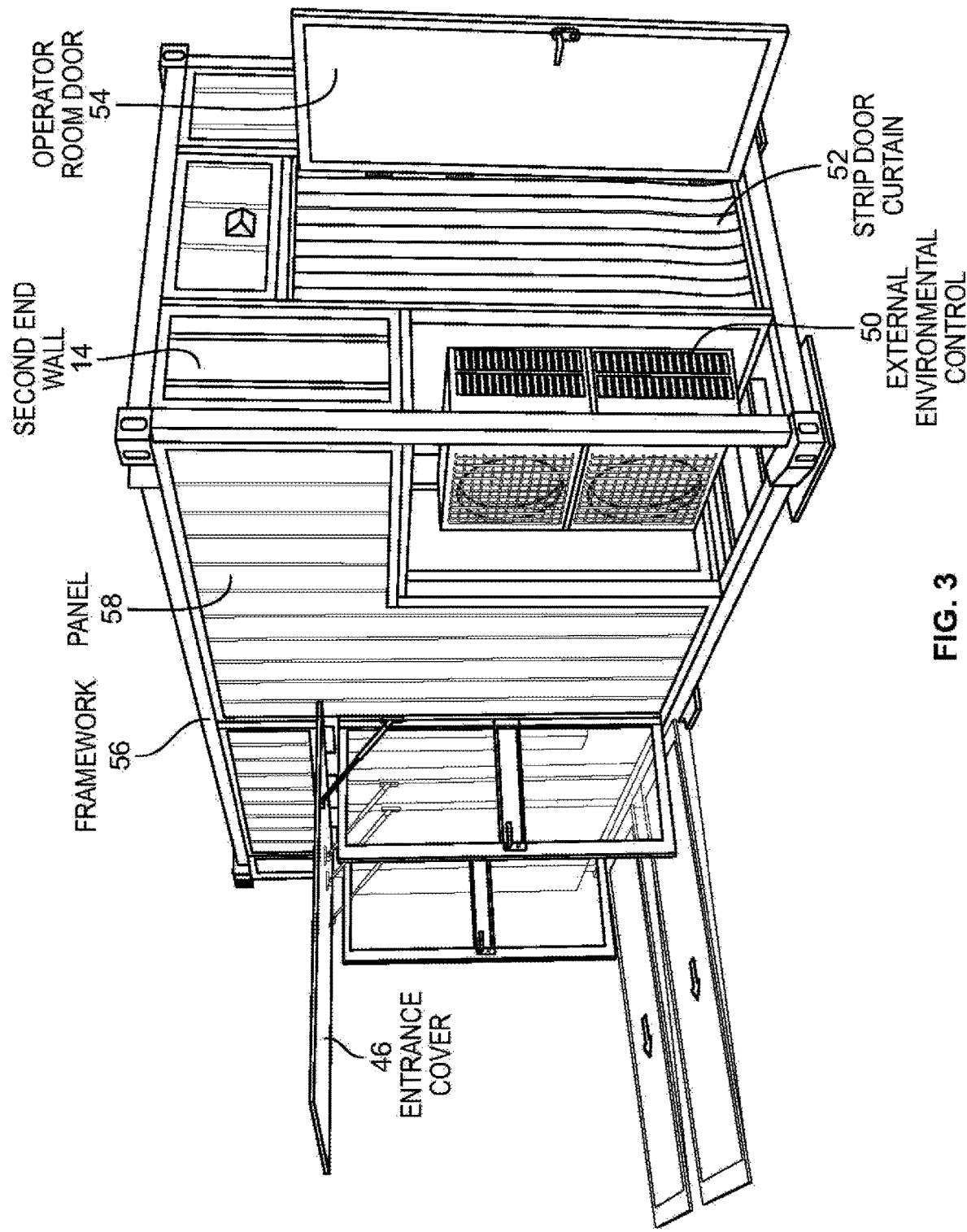
FIG. 3 is another view of the transportable container of FIG. 1, in accordance with various embodiments.
Figure 4:
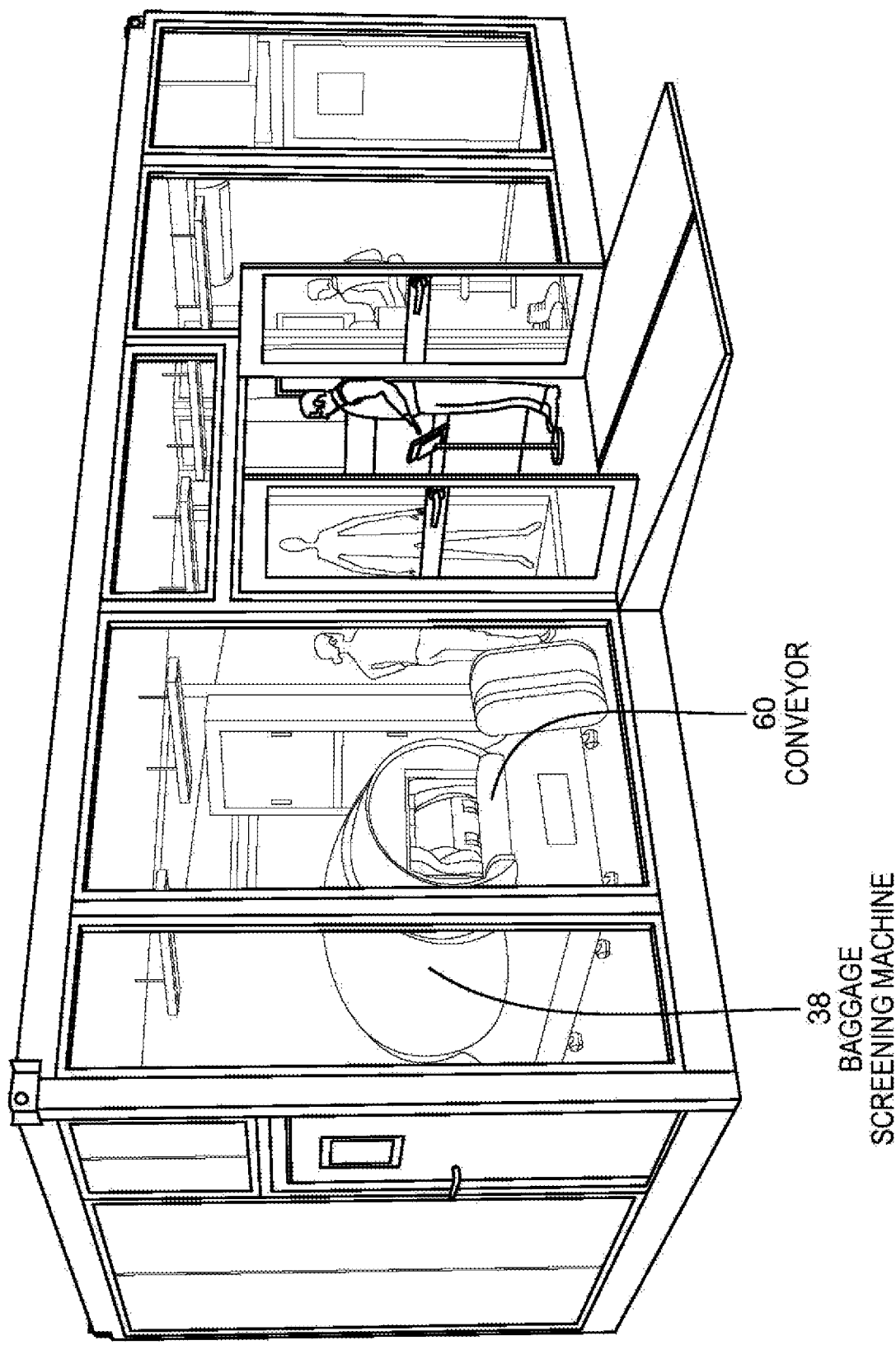
FIG. 4 is a view of a transportable container emphasizing the baggage screening module, in accordance with various embodiments.
Figure 5:
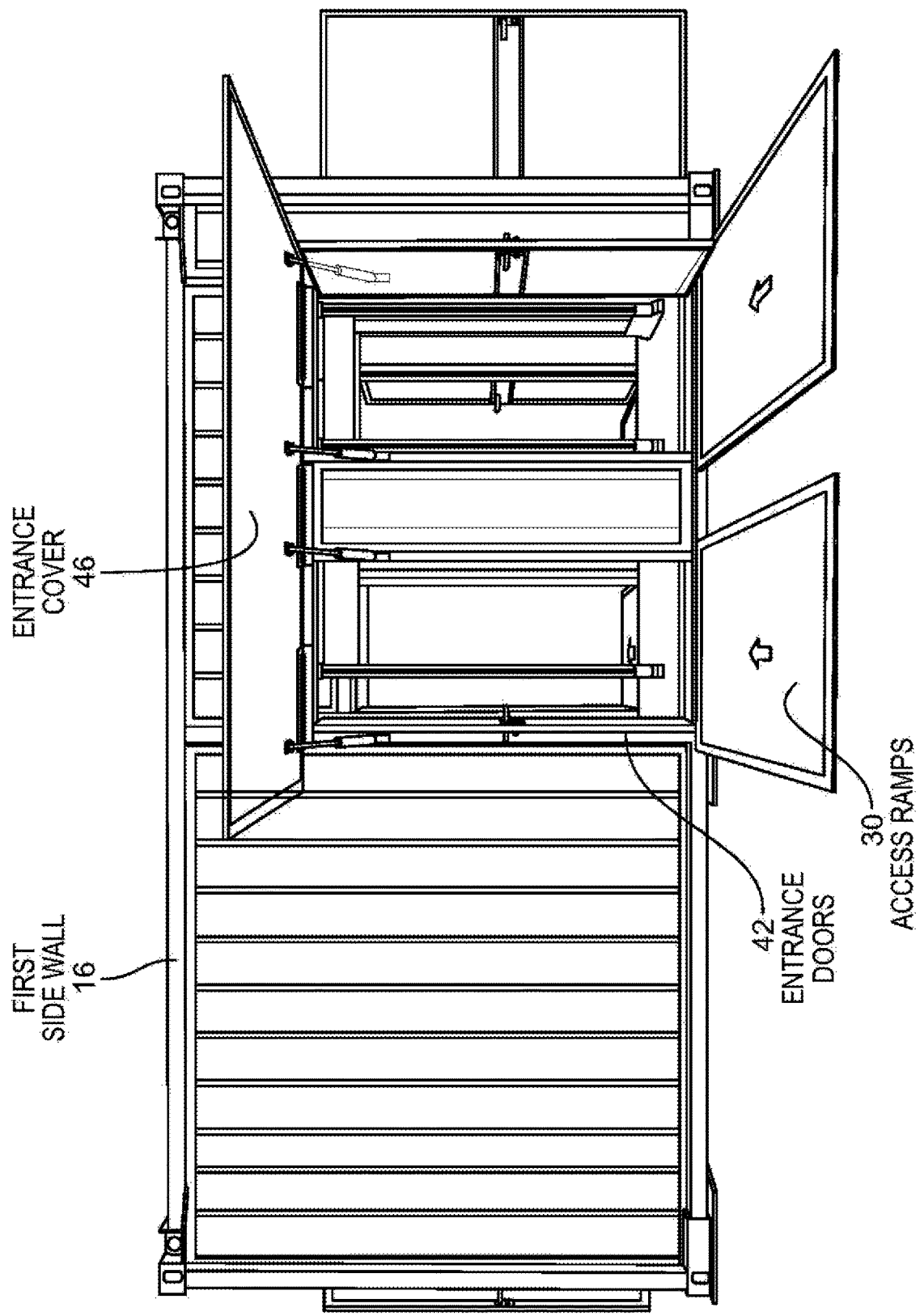
FIG. 5 is an entrance side view of the transportable container of FIG. 1, in accordance with various embodiments.
Figure 6:
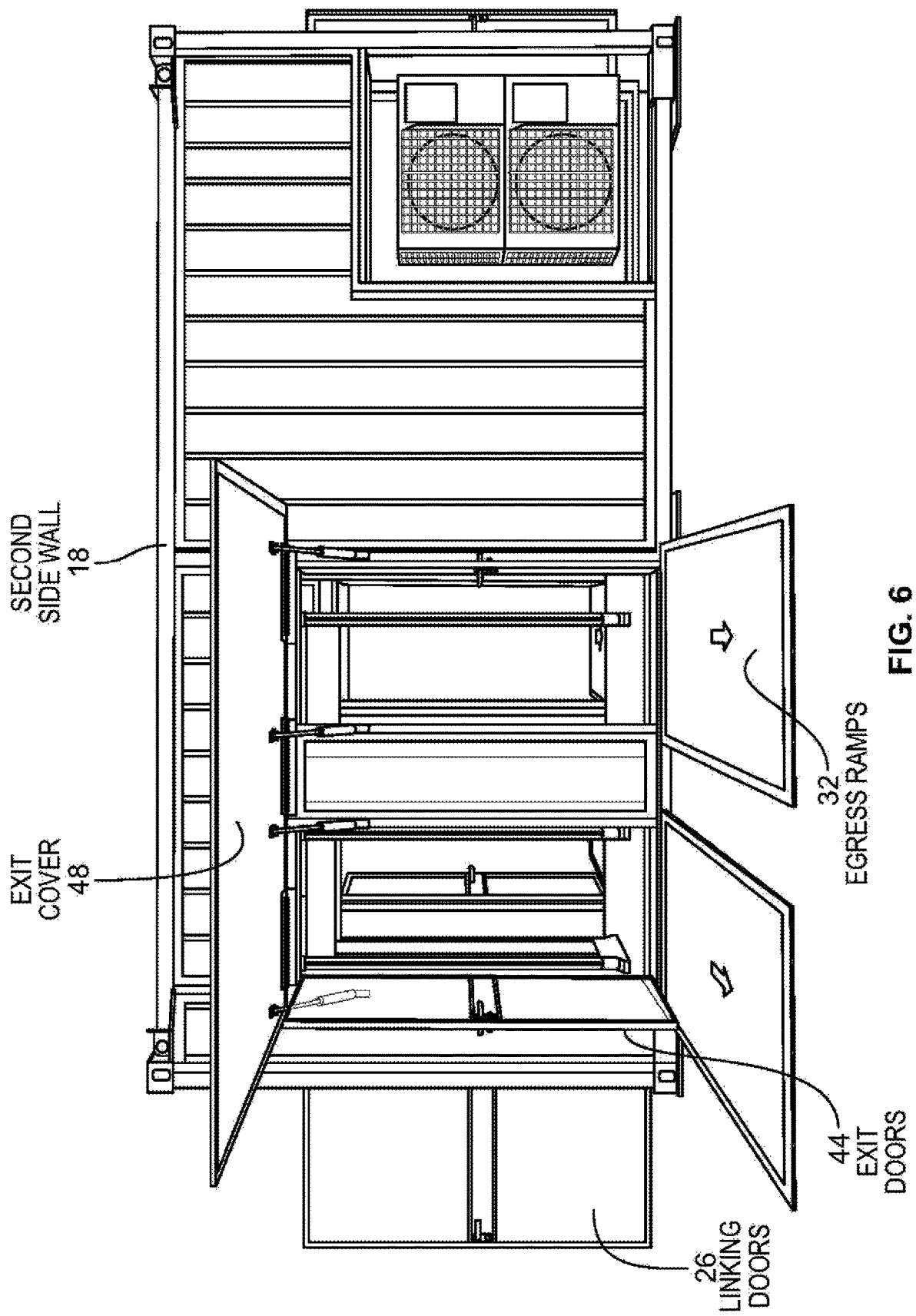
FIG. 6 is an exit side view of the transportable container of FIG. 1, in accordance with various embodiments.

FIGS. 1 to 6 disclose various views of a transportable container 10 according to embodiments of the present disclosure. The transportable container 10 is configured to be readily transported to different events or locations to establish a pop-up body and/or baggage screening module. The transportable container 10 includes one or more walk through body scanners 24 disposed between entrance doors 42 (or one entrance door) and exit doors 44. The body scanners 24 include a metal detector or an imaging device such as an X-ray or millimeter wave imaging device. The transportable container 10 may also include a baggage screening machine 38. The baggage screening machine 38 may include a computerized X-ray machine. The body scanners 24 and the baggage screening machine 38 are configured to detect and/or identify at least one of explosive materials, and weapons and illicit materials such as illegal narcotics. The baggage screening machine 38 includes a conveyor 60 to transport baggage between an in-teed end and an out-feed end. The in-feed end is disposed on an entrance side of the body scanner 24 and the out-feed end is disposed on an exit side of the body scanner 24.

In embodiments, the transportable container 10 is box shaped. That is, the transportable container 10 is generally a rectangular prism that has relatively long side walls 16, 18 and relatively short end walls 12, 14. The entrance doors 42 and the exit doors 44 are included in the relatively long side walls in the present embodiment. Thus, the transportable container 10 has a substantially elongate cuboid shape including a base (or floor), a first end wall 12, a second end wall 14, a first side wall 16, a second side wall 18 and a top or roof. The transportable container 10 provides a weather proof housing for the baggage screening machine 38, the body scanners 24 (or single body scanner 24), persons and other equipment located therein. The body scanners 24 and the baggage screening machine 38 are mounted to the floor or base of the transportable container 10 in such a way as to allow transport by lorry/truck and lifting by crane without damage to the equipment.

The transportable container 10 includes the entrance doors 42 and the exit doors 44 that are located in direct opposition to one another so that individuals can walk in a straight line from the entrance to the exit and through the body scanners 24. There are two openable and closeable entrance and exit doors 42, 44 in the illustrated embodiment but just one door may be provided at each of the entrance and the exit. The entrance and exit doors 42, 44 are hinged doors in the disclosed embodiment but other types of door may be provided such as vertically shutting doors (e.g. roller shutter doors) in other embodiments. The baggage screening machine 38 is located to one side of the body scanners 24 so that individuals can pass any baggage to be screened through the baggage screening machine 38 and thereafter walk through the body scanners 24 and pick up their baggage on the other side of the baggage screening machine 38.

In embodiments, the transportable container 10 includes a framework 56 such as a steel framework 56. The steel framework 56 defines a frame for the rectangular box. Some of the walls or panels encompassed by the framework 56 may be lightweight panels 58. For example, first and second sidewalk 16, 18 are constructed by relatively lightweight panels 58 mounted to the steel framework 56. The panels 58 can include one or more boards of insulating material (like glass fiber) including outer cladding. The transportable container 10 includes corner lifting points/fittings 40 in some embodiments. In this way, the transportable container 10 can be delivered/shipped by lorry/truck and lifted by crane. The shipping container is at least 20 feet in length between the first and second end walls 12, 14 and at least 7 feet in width (between the first and second sidewalk 16, 18) and height (between the floor and the roof).

It is to be noted that the transportable container 10 is set up in an operational condition in that the body scanners 24 and the baggage screening module 38 are set up in their normal operating positions and orientations, even when the transportable container 10 is in storage or is being transported. Therefore, the transportable container 10 can be transported from a storage position to its temporary place of use, in a condition that is substantially ready for operation, it just being necessary to connect the transportable container to an appropriate power source at the place of use.

The transportable container 10 includes one or more linking doors 26 located in the first end wall 12. The linking doors 26 allow connection to a search room (which may be another transportable container), which can be a private or discrete room for a body search of any individual found to be carrying illicit materials. The transportable container can also include windows and further doors as desired by use-case requirements.

The transportable container includes a control unit 20, which provides controls for the body scanners 24 and the baggage screening machine 38. In particular, the control unit 20 is configured to receive data from the body scanners 24 and the baggage screening machine 38 and to generate one or more displays showing a visual representation of the imaging of the body scanners 24 and the baggage screening machine 38. The visual representation is output on one or more display devices operationally connected to the control unit 20. The one or more display devices may be included in an operator room 22 that is partitioned from a space within which the body scanners 24 and the baggage screening machine 38 are located. The control unit 20 can include a data communications link (not shown) for connecting the control unit to an external operator area via wired or wireless network communications.

Software of the control unit 20 has various functions. The software may create an interface between the body scanners 24, the baggage screening machine 38 and remote security workstations. The software is configured to flag persons and baggage security status information and provide 3D high resolution images. Local or remote operators can interrogate the image and then change the security status of each individual bag or part of an image of a person The software may also control a fire alarm, whereby fire and smoke sensors within the transportable container 10 may provide alarm signals to the control unit 20. The control unit 20 may respond by sounding an alarm and optionally automatically closing the container 10.

An electrical distribution board (not shown) is provided to supply power to each electrical system (e.g. the one or more cameras 28, the one or more body scanners 24, the one or more air curtains 34, any display device in the operating room 22, the environmental control unit 36 and the baggage screening machine 38) within the transportable container 10. The electrical distribution board is connected to a connector arranged for connecting with a mains supply. The mains supply provides a 3 phase supply and/or a single phase supply. The distribution board distributes 415V; 230V and 12V supplies. The module may also include a connector for connecting the distribution board with an electrical generator, which can be used if a mains supply is unavailable.

When not in use, the transportable container 10 is stored in a storage area, which may be a space within a building, such as a hanger, or alternatively an outside space. The storage area may be located at the transport hub, or may be located at a different site.

In embodiments, the transportable container 10 includes an environmental control unit 36 for controlling a temperature within the transportable container 10. The environmental control unit 36 may include an air conditioning unit capable of heating and cooling so that the internal volume of the transportable container 10 can be kept at a target temperature that can be adjustably set by a user through the control unit 20. The transportable container 10 includes external/outside environmental control unit 50 (e.g. including a compressor and a fan) that interfaces with air on the outside of the transportable container 10. The external/environmental control unit 50 is located within an outer profile or envelope of the transportable container 10 so as not to project from the framework 56, thereby protecting against potential damage.

In an embodiment, the transportable container 10 includes at least one camera 28 mounted to the transportable container 10. The cameras 28 can be mounted in respective corners of the transportable container 10. At least one camera 28 is aimed to capture video of individuals as they walk through the body scanners 24. The cameras 28 can be connected to facial recognition and/or queue counting processing, which may be performed by the control unit 20 or performed by one or more external processing devices. The processing provides the capability for any certified security agency to remotely access the captured video and cross check against Governmental watch lists etc to fully understand any threats from the people present. As such, the control unit 20 may be configured to keep a record of the video data captured by the cameras 28 and may transmit the video data to an external device.

In embodiments, an access ramp 30 and an egress ramp 32 are arranged at the entrance doors 42 and the exit doors 44, respectively. The access and egress ramps 30, 32 are stored within the transportable container 10 during transport to an event.

In embodiments, air curtain devices are mounted to the transportable container 10 and arranged above the entrance and exit doors 42, 44 to make an air curtain when the doors are open. This supports environmental control within the transportable container 10.

In embodiments, the entrance and exit doors 42, 44 may be covered by entrance and exit covers 46, 48 during transport. The entrance and exit covers 46, 48 are movable from a position flush with closed entrance and exit doors 42, 44 (i.e. parallel to the respective first and second sidewalls 16, 18) to a raised position substantially perpendicular with the respective first and second sidewalls 16, 18 providing a rain cover for individuals walking through the entrance and exit doors 42, 44. The entrance and exit covers 46, 48 may open in other fashions. The entrance and exit covers 46, 48 provide a shield during transport of the transportable container 10 to avoid a glass window in the entrance and exit doors 42, 44 from breakage.

In use, the transportable container 10 is delivered by road, rail, ship, etc. to an event desiring a guest screening service. The transportable container 10 may be lifted onto, and off, the transport vehicle by crane where chain hooks can be attached to the corner lifting points 40. At the event site, the distribution panel is connected to an external power source via a power connection included with the transportable container 10. The entrance and exit covers 46, 48 are raised at the event site and held in the raised position by a suitable hinge (e.g. a hinge including a piston). The entrance and exit doors 42, 44 and the access and egress ramps 30, 32 are arranged at the entrance and exit doors 42, 44 to provide wheel chair access to and from the transportable container 10. An operator may be situated in the operator room 22 or in an external operator room. Guests at the event walk through the entrance and exit doors 42, 44 and through the body scanners 24. The body scanners 24 provide imaging data or other scanning data to the control unit 20, which can locally generate a visual representation of the data on a display device in the operator room 22. Alternatively, the data may be remotely transmitted, where it is rendered on an operator display device. The control unit 20, or a remote processor, may run illicit materials detection software that will raise an alert when any illicit materials are automatically identified. Any baggage of the guests may be passed through the baggage screening machine 38 for similar data processing as with the data from the body scanners. The cameras 28 capture video of the guests as they walk between the entrance and exit doors 26 and facial recognition technology may be locally or remotely run.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. A transportable container, comprising:
   a first end wall and an oppositely positioned second end wall;
   a first sidewall and an oppositely positioned second sidewall, wherein the first side wall and the second side wall are longer than the first end wall and the second end wall;
   a screening space enclosed between the first sidewall and the second sidewall;
   an entrance;
   an exit;
   a body scanner disposed in the screening space between the entrance and the exit, wherein the screening space is non-partitioned; and
   an external environmental control unit for controlling a temperature within the transportable container,
   wherein the transportable container includes a steel or other metal rectangular prism framework and relatively light weight wall panels,
   wherein the external environmental control unit is located within an envelope of the transportable container so as not to project from the framework,
   wherein the external environmental control unit comprises a compressor and a fan mounted within the framework and covered by one of the wall panels,
   wherein the wall panels include ventilation openings for interfacing with outside air while protecting the external environmental control unit from damage during transport,
   wherein the transportable container has a longitudinal axis extending between the first end wall and the second end wall, and a lateral axis extending between the first sidewall and the second sidewall, and
   wherein the entrance is in the first sidewall and the exit is in the second sidewall such that a path of movement through the transportable container is transverse to the longitudinal axis of the transportable container.

2. The transportable container of claim 1, wherein the body scanner includes a metal detector.

3. The transportable container of claim 1, wherein the body scanner includes an imaging device.

4. The transportable container of claim 3, wherein the imaging device includes an X-ray or millimeter wave imaging device.

5. The transportable container of claim 1, comprising a baggage screening machine.

6. The transport container of claim 5, wherein the baggage screening machine includes a computerized X-ray machine.

7. The transportable container of claim 5, wherein the baggage screening machine includes a conveyor to transport baggage between an in-feed end and an out-feed end.

8. The transportable container of claim 7, wherein the in-feed end is disposed on an entrance side of the body scanner and the out-feed end is disposed on an exit side of the body scanner.

9. The transportable container of claim 1, comprising corner lifting fittings such that the transportable container can be lifted by crane.

10. The transportable container of claim 1, wherein the transportable container is box shaped.

11. The transportable container of claim 1, wherein the transportable container is a rectangular prism.

12. The transportable container of claim 1, comprising a partitioned operator room.

13. The transportable container of claim 12, wherein the operator room includes a display interface for displaying a representation of an output from the body scanner.

14. The transportable container of claim 1, comprising at least one camera mounted to the transportable container.

15. The transportable container of claim 1, comprising an access ramp and an egress ramp.

16. The transportable container of claim 1 having relatively long side walls and relatively short end walls, wherein the entrance and exit are included in the relatively long side walls.

17. The transportable container of claim 16, comprising a linking door in one of the relatively short end walls to connect to an external search room.

18. The transportable container of claim 1, wherein the entrance and exit include openable and closeable doors and an air curtain device to make an air curtain when the doors are open.

19. The transportable container of claim 5, wherein the screening space comprises an unobstructed open area that accommodates both the body scanner and a baggage screening machine positioned within the open area.

20. The transportable container of claim 12, wherein the partitioned operator room is structurally separated from the screening space by a partition wall, wherein the operator room is positioned adjacent to the screening space and includes a display interface for monitoring the body scanner, and wherein the operator room is spatially distinct from the external environmental control unit.

21. The transportable container of claim 20, wherein the external environmental control unit is positioned at a corner of the transportable container formed by the intersection of one of the end walls and one of the sidewalls, and wherein the corner positioning of the external environmental control unit is spatially separated from both the screening space and the partitioned operator room, thereby maximizing usable space within both the screening space and the operator room.

* * * * *